United States Patent
Fujitani

(10) Patent No.: US 9,300,881 B2
(45) Date of Patent: Mar. 29, 2016

(54) IMAGE PROCESSING APPARATUS THAT IS CAPABLE OF CUTTING OUT SPECIFIC AREA IN IMAGE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Yohei Fujitani, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 125 days.

(21) Appl. No.: 13/719,494

(22) Filed: Dec. 19, 2012

(65) Prior Publication Data

US 2013/0155289 A1 Jun. 20, 2013

(30) Foreign Application Priority Data

Dec. 19, 2011 (JP) ................................. 2011-277062

(51) Int. Cl.
*H04N 5/232* (2006.01)
*H04N 5/262* (2006.01)
*H04N 101/00* (2006.01)

(52) U.S. Cl.
CPC .......... *H04N 5/2621* (2013.01); *H04N 5/23216* (2013.01); *H04N 5/23219* (2013.01); *H04N 5/23296* (2013.01); *H04N 5/2628* (2013.01); *H04N 2101/00* (2013.01); *H04N 2201/0084* (2013.01)

(58) Field of Classification Search
CPC .......... H04N 5/23216; H04N 5/23219; H04N 5/23296; H04N 5/3454
USPC ........ 348/222.1, 231.99, 231.2, 231.3, 231.6, 348/240.2
See application file for complete search history.

(56) References Cited

U.S. PATENT DOCUMENTS

| 8,396,246 B2* | 3/2013 | Anbalagan et al. ........... 382/100 |
| 9,020,183 B2 | 4/2015 | Anbalagan et al. |
| 2009/0040315 A1* | 2/2009 | Nakase et al. ........... 348/207.99 |
| 2010/0054600 A1* | 3/2010 | Anbalagan et al. ........... 382/180 |
| 2010/0054601 A1* | 3/2010 | Anbalagan et al. ........... 382/180 |
| 2013/0195374 A1* | 8/2013 | Fukata et al. ................. 382/282 |

FOREIGN PATENT DOCUMENTS

| CN | 102132312 A | 7/2011 |
| JP | 2009-065635 A | 3/2009 |

OTHER PUBLICATIONS

Office Action issued in Chinese Appln No. 201210548349.X dated May 13, 2015. English translation provided.

* cited by examiner

*Primary Examiner* — Daniel M Pasiewicz
(74) *Attorney, Agent, or Firm* — Rossi, Kimms & McDowell LLP

(57) ABSTRACT

An image processing apparatus that is capable of using frame information associated with image data effectively for an image that is formed by trimming the image shown by the image data. The image processing apparatus processes image data with which frame information about a partial area in an image is associated. A trimming unit cuts out a selection area as a trimming image from an image represented by the image data. A determination unit determines whether frame information updated according to the area cut out by the trimming unit is added to the trimming image or not based on a determination of whether a specific frame effective area in the area shown by the frame information is included in the trimming image or not.

6 Claims, 8 Drawing Sheets

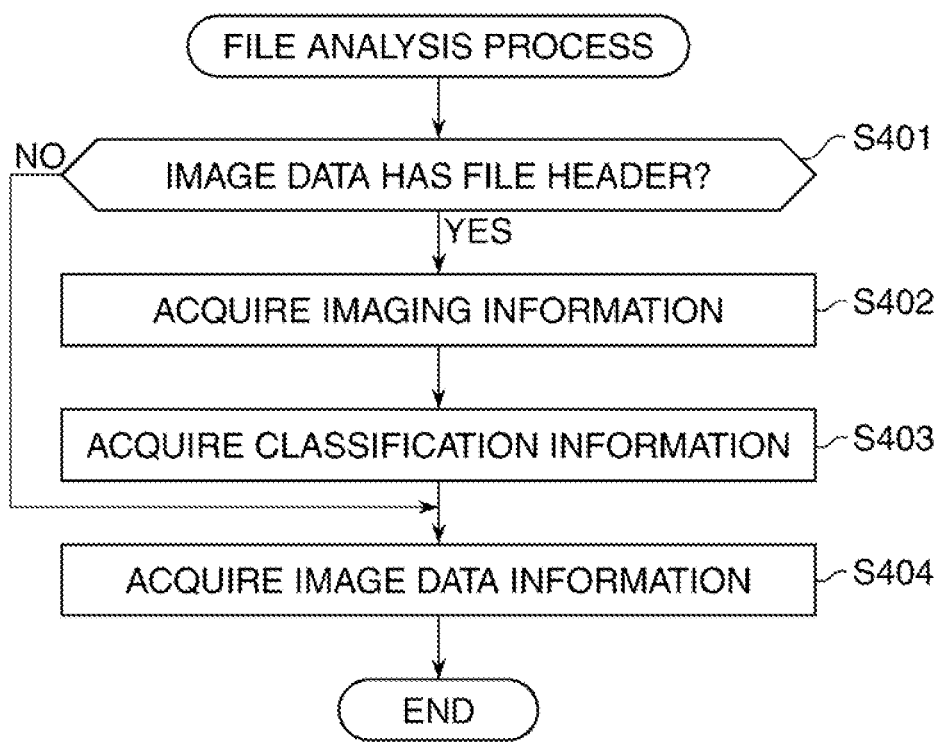

FIG.5

| |
|---|
| 【FRAME INFORMATION】: ~501 |
| ● FRAME ATTRIBUTE INFORMATION<br>· FACE RECOGNITION FRAME ~502 |
| ● FRAME AREA INFORMATION<br>· WIDTH<br>· HEIGHT ~503 |
| ● FRAME CENTER INFORMATION<br>· X COORDINATE<br>· Y COORDINATE ~504 |
| ● FRAME RELATED INFORMATION<br>· PERSON'S NAME<br>· BIRTHDAY<br>· GENDER<br>· FACIAL FEATURE<br>　+COORDINATES OF BOTH EYES<br>　+COORDINATE OF NOSE<br>　+SIZE OF PROFILE<br>　+CLOSED EYES<br>　+COORDINATES OF MOUTH EDGES<br>　+ORIENTATION OF FACE<br>· OTHER<br>　+FOCUS RATE<br>　+FRAME EFFECTIVE AREA ~505 |

IMAGE PROCESSING APPARATUS THAT IS CAPABLE OF CUTTING OUT SPECIFIC AREA IN IMAGE, CONTROL METHOD THEREFOR, AND STORAGE MEDIUM STORING CONTROL PROGRAM THEREFOR

BACKGROUND OF THE INVENTION

1. Field of the Invention

The present invention relates to an image processing apparatus that is capable of cutting out a specific area in an image, a control method therefor, and a storage medium storing control program therefor.

2. Description of the Related Art

In recent years, small sized electronic equipment, such as a digital still camera, is also equipped with a face detecting function, which is used to detect a face for focusing at the time of taking an image. When a person is recognized and a face is detected, authentication information (a name etc.) can be given to an image. In such a case, the name can be superimposed on the image using the authentication information when the image is displayed, and the image can be searched with the person's name.

Japanese Laid-Open Patent Publication (Kokai) No. 2009-65635 (JP 2009-65635A) discloses a technique of cutting an image to which subject location information is attached, editing the image, performing a face detection process to the cut-out image, and automatically giving classification information based on the detected face information.

However, when the authentication information is deleted whenever the image is edited by trimming regardless of a trimming area, the name will not be displayed and the image concerned is excluded from retrieval objects.

Although the device disclosed in JP 2009-65635A can perform the face detection process again after the trimming, a device that cannot perform the face detection process cannot detect again.

Further, when the image is trimmed so as to lack a part of the face, the face detection process of the device may not be able to detect the face even if it is visible as a face for human eyes. Such a case is inconvenient because the authentication information originally given becomes lost after the trimming.

SUMMARY OF THE INVENTION

Aspects of the present invention solve all of the above mentioned problems or at least one of the problems.

The present invention provides an image processing apparatus, a control method therefor, and a storage medium storing a control program therefore, which are capable of using frame information associated with image data effectively for an image that is formed by trimming the image shown by the image data.

Accordingly, a first aspect of the present invention provides an image processing apparatus that processes image data with which original frame information about a partial area in an image is associated, comprising a trimming unit configured to cut out a selection area as a trimming image from an image represented by the image data, and a determination unit configured to determine whether frame information updated according to the area cut out by the trimming unit is added to the trimming image or not based on a determination of whether a specific frame effective area in the area shown by the original frame information is included in the trimming image or not.

Accordingly, a second aspect of the present invention provides an image processing apparatus that processes image data with which original frame information about a partial area in an image is associated, comprising a trimming unit configured to cut out a selection area as a trimming image from an image represented by the image data, and a switching unit configured to switch switching between a state where frame information updated according to the area cut out by the trimming unit is displayed with the trimming image and a state where the updated frame information is not displayed with the trimming image, based on a determination of whether a specific frame effective area in the area shown by the frame information is included in the trimming image or not.

Accordingly, a third aspect of the present invention provides a control method for an image processing apparatus that processes image data with which original frame information about a partial area in an image is associated, the control method comprising a trimming step of cutting out a selection area as a trimming image from an image represented by the image data, and a determination step of determining whether frame information updated according to the area cut out in the trimming step is added to the trimming image or not based on a determination of whether a specific frame effective area in the area shown by the original frame information is included in the trimming image or not.

Accordingly, a fourth aspect of the present invention provides a control method for an image processing apparatus that processes image data with which original frame information about a partial area in an image is associated, the control method comprising a trimming step of cutting out a selection area as a trimming image from an image represented by the image data, and a switching step of switching between a state where frame information updated according to the area cut out in the trimming step is displayed with the trimming image and a state where the updated frame information is not displayed with the trimming image, based on a determination of whether a specific frame effective area in the area shown by the original frame information is included in the trimming image or not.

Accordingly, a fifth aspect of the present invention provides a non-transitory computer-readable storage medium storing a control program causing a computer to execute the control method of the third aspect.

Accordingly, a sixth aspect of the present invention provides a non-transitory computer-readable storage medium storing a control program causing a computer to execute the control method of the fourth aspect.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart showing a file analysis process executed in the step S305 in FIG. 3.

FIG. 5 is a view showing frame information relevant to a trimming process.

DESCRIPTION OF THE EMBODIMENTS

Various exemplary embodiments, features, and aspects of the invention will be described in detail below with reference to the drawings.

It should be noted that an image pickup apparatus to which the image processing apparatus of the present invention is applied will be described in this embodiment.

Figure 1:
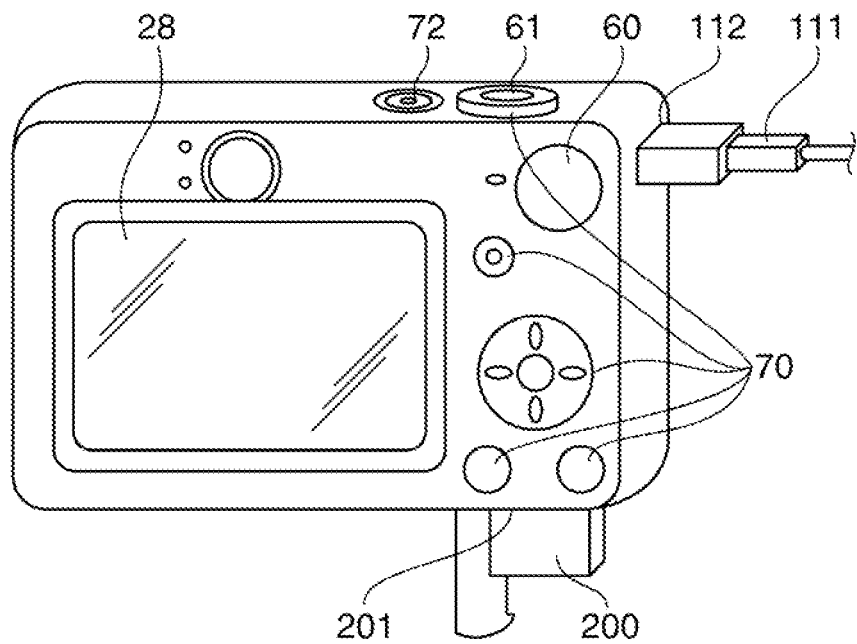
FIG. 1 is a perspective view showing an external appearance of an image pickup apparatus according to an embodiment of the present invention.

FIG. 1 is a perspective view showing an external appearance of an image pickup apparatus 100 according to an embodiment of the present invention.

As shown in FIG. 1, the image pickup apparatus 100 includes a display unit 28, a mode change button 60, a shutter button 61, an operation member group 70, a power switch 72, a connector 112, and a slot 201. A detachable storage medium 200 can be inserted into the slot 201. The image pickup apparatus 100 can be electrically connected with an external device through a connecting cable 111 connected to the connector 112.

The display unit 28 displays an image shown by image data and variety of information which image data shows. It should be noted that displaying of an image shown by image data may be expressed as displaying of image data in the following description.

The power switch 72 is operated by a user to change the power between ON and OFF.

The mode change button 60 is used to change various modes. The operation member group 70 receives various operations from a user.

Figure 2:
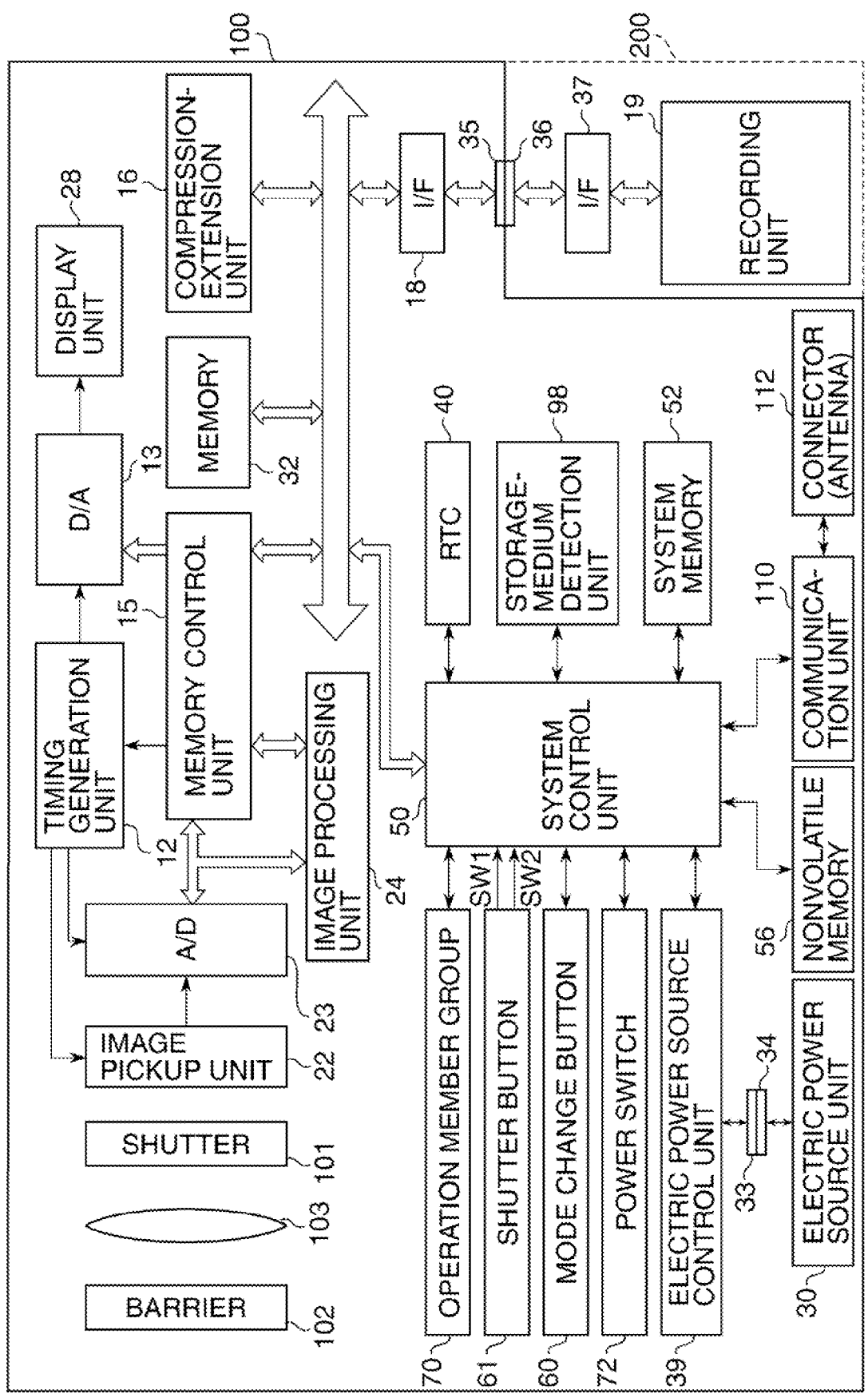
FIG. 2 is a block diagram showing an electric configuration of the image pickup apparatus in FIG. 1.

FIG. 2 is a block diagram showing an electric configuration of the image pickup apparatus 100 in FIG. 1.

A barrier 102 covers a lens 103 when the lens is not used, and prevents defilement and breakage of the lens. The shutter 101 is provided with a stop function, too. An image pickup unit 22 comprises a CCD, a CMOS device, etc. that convert an optical image into an electrical signal.

An A/D converter 23 converts the analog signal outputted from the image pickup unit 22 into a digital signal. The timing generation unit 12 is controlled by a memory control unit 15 and a system control unit 50, and supplies a clock signal and a control signal to the image pickup unit 22, the A/D converter 23, and a D/A converter 13.

An image processing unit 24 is controlled by the system control unit 50 and the memory control unit 15 to apply a predetermined pixel interpolation process, a resizing process, a color conversion process, a trimming process, etc. to image data in a memory 32, data outputted from the A/D converter 23, and data outputted from the memory control unit 15. The image processing unit 24 performs a predetermined calculation process using the image data taken, and the system control unit 50 performs an exposure control and a distance measuring control based on the calculation result. According to these controls, an AF (auto-focusing) process with a TTL (through the lens) system, an AE (automatic exposure) process, and an EF (pre-emission of flash) process are performed. The image processing unit 24 performs a predetermined calculation process using the image data taken, and performs an AWB (automatic white balance) process with the TTL system based on the calculation result.

The data outputted from the A/D converter 23 is stored into the memory 32 via the image processing unit 24 and the memory control unit 15, or is stored into the memory 32 via the memory control unit 15 only. The memory 32 (a storage unit) has sufficient memory capacity for storing still images of a predetermined number of sheets, and moving image with sound of predetermined time period. The memory 32 stores programs for executing processes shown in flowcharts in FIGS. 3, 4, 6, 7, and 8 described later.

A compression-extension unit 16 compresses and extents image data by an adaptation discrete cosine transform (ADCT) etc. That is, the compression-extension unit 16 compresses the image data read from the memory 32, and stores the compressed image data into the memory 32. The compression-extension unit 16 reads the compressed image data that is developed onto the memory 32 from a recording unit 19, performs an extension process, and stores the image data processed into the memory 32.

The image data written into the memory 32 by the compression-extension unit 16 is compiled into a file by a filing section of the system control unit 50. The generated file is stored into the storage medium 200 via an interface 18.

The memory 32 also serves as a memory for displaying an image. The display unit 28 comprises an LCD etc. The image data for displaying written in the memory 32 is displayed on the display unit 28 via the D/A converter 13.

The system control unit 50 is provided with a CPU and so on, functions according to control programs stored in the memory 32 and a system memory 52, and controls the image pickup apparatus 100 globally. The system control unit 50 generates attribute information given to an image by a calculation process of the image process of the image processing unit 24. The system control unit 50 also generates information, such as frame information and attribute information of the frame, which is mentioned later. The system control unit 50 determines whether frame information should be given to a new image after trimming using the frame information given to an original image before trimming.

The system control unit 50 compiles the attribute information image into a file together with the image data processed by the compression-extension unit 16. The system memory 52 stores constants, variables, programs, etc. for operation of the system control unit 50.

A nonvolatile memory 56 is able to erase and store information electrically, and an EEPROM is employed for example.

The shutter button 61 has functions of two switches that are a first shutter switch SW1 and a second shutter switch SW2.

The first shutter switch SW1 turns ON by a half press of the shutter button 61, and instructs to start the operations, such as the AF process, the AE process, the AWB process, and the EF process, mentioned above.

The second shutter switch SW2 turns ON by a full press of the shutter button 61, and instructs to start a series of image pickup processes from a process that reads a signal from the image pickup unit 22 to a process that stores the image data into the storage medium 200.

The operation member group 70 is used in order that a user inputs various kinds of operation instructions to the system control unit 50. The user can select the operational mode of the system control unit 50 from among a still image pickup mode, a continuous image pickup (continuous shooting) mode, a moving image mode, and a replay mode etc. by operating the mode change button 60.

The operation-member-group 70 comprises a touch panel and various buttons, such as a deletion button, a menu button, a SET button, four-direction keys arranged as a cross, and a print reservation button that instructs the printer connected to the connector 112 to print.

When the menu button is pressed, a menu screen for various settings is displayed on the display unit 28. The user can intuitively perform various settings using the menu screen displayed on the display unit 28, the four-direction keys, and the SET button.

An electric power source control unit 39 comprises a battery detection circuit, a DC-DC converter, a switching circuit that changes a block to energize. The electric power source control unit 39 detects whether a battery has been worn, and detects a battery type and battery residue. The electric power source control unit 39 controls the DC-DC converter based on the detection result and instructions from the system control unit 50, and supplies a required voltage to the respective units including the storage medium 200 during a required period.

An electric power source unit 30 comprises a primary battery like an alkaline battery a lithium battery, a secondary battery like a NiCd battery, a NiMH battery, a Li battery, and an AC adaptor. Connectors 33 and 34 connect the electric power source unit 30 with the electric power source control unit 39.

A RTC (Real Time Clock) 40 includes an electric power source unit aside from the electric power source control unit 39, and can operate even when the electric power from the electric power source unit 30 is cut off. The system control unit 50 performs a timer control using the time and date acquired from the RTC 40 at the time of starting.

The interface 18 connects the storage media 200, such as a memory card and a hard disk, with the image pickup apparatus 100. A connector 35 connects the storage medium 200 with the interface 18. The storage-medium detection unit 98 detects whether the storage medium 200 is connected to the connector 35.

The storage medium 200 is a memory card, a hard disk, etc. The storage medium 200 is provided with the recording unit 19, such as a semiconductor memory or a magnetic disk, an interface 37 with the image pickup apparatus 100, and a connector 36 for connecting the storage medium 200 with the image pickup apparatus 100.

A communication unit 110 performs various communication processes including communication using standards of RS232C, USB, IEEE1394, P1284, SCSI, etc., communication using a modem, communication using a LAN, wireless communications, etc.

The connector 112 connects the image pickup apparatus 100 with another apparatus via the communication unit 110. In the case of wireless communication, this connector 112 serves as an antenna. A printer is connected to the connector 112, for example. When a printer is connected, image data can be directly printed using the printer without using a PC by transferring the image data recorded in the storage medium 200 to the printer.

Figure 3:
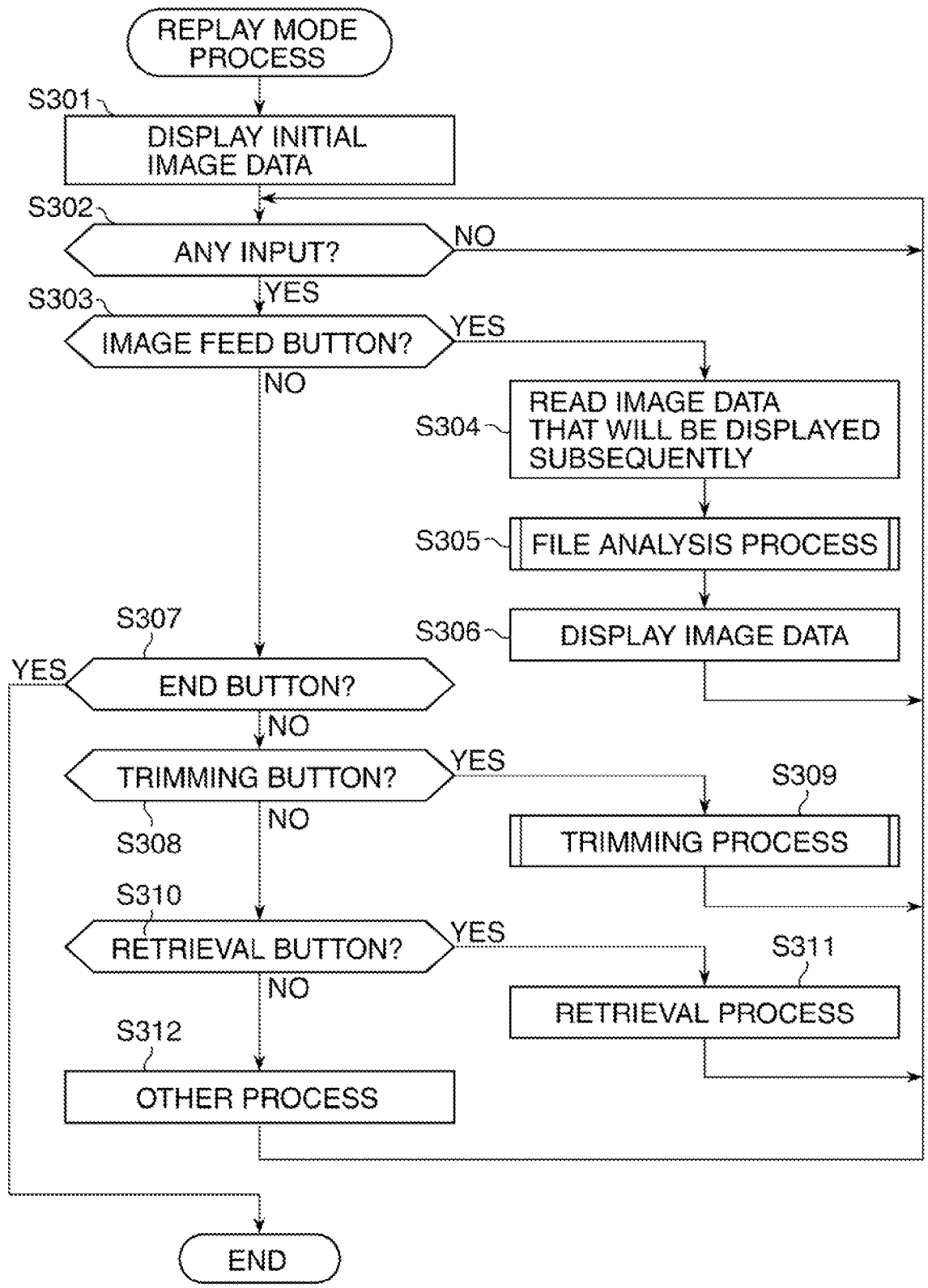
FIG. 3 is a flowchart showing a replay mode process executed by a system control unit in FIG. 2.

FIG. 3 is a flowchart showing a replay mode process executed by the system control unit 50 in FIG. 2.

As shown in FIG. 3, the system control unit 50 reads initial image data that shows a newest image or a resume image from the storage medium 200, and displays it on the display unit 28 (step S301). At this time, the system control unit 50 acquires frame information (information about a frame that shows an arbitrary area set in an image) in the initial image by analyzing an image file and analyzing the attribute information of a header section, and also acquires the number of pieces of frame information in this image (equivalent to a variable MAX mentioned later). Next, the system control unit 50 determines whether there is any input from a user (step S302). The input includes an event that notifies undervoltage etc. in addition to a general input like a user's operation to a button or a battery lid.

When determining that there was an input (YES in the step S302), the system control unit 50 determines whether the input is due to an operation of an image feed button (step S303).

When the input is due to the operation of the image feed button (YES in the step S303), the system control unit 50 reads image data that will be displayed subsequently from the memory 32 (step S304). It should be noted that the image feed button is formed as a pair of members that are directed in opposite directions and that the image data that will be displayed subsequently is determined by the direction of the operated member.

Next, the system control unit 50 performs a file analysis process that analyzes the read image data (step S305), displays the image data on the display unit 28 (step S306), and proceeds with the process to step S302. In addition to the image data, image information, the attribute information, a frame that indicates a position to be focused or a position of a face, and a person's name are displayed in the step S306.

The frame that indicates a position to be focused or a position of a face is displayed with the image displayed on the display unit 28. The frame that indicates a position to be focused or a position of a face is more preferably superimposed over the image displayed on the display unit 28. It should be noted that the frame may display not only a position of a face but also a part of a person's body.

The person's name is displayed near the frame that indicates a face area. Accordingly, the system control unit 50 reads the header of the image in addition to the image data, acquires the frame information mentioned later and the person's name, and also acquires the number of pieces of the frame information in the image in the step S305. When the result of the file analysis process in the step S305 reveals that the image data is invalid due to a partial corruption of the image data, the system control unit 50 displays an error message.

When the input is not due to the operation of the image feed button (NO in the step S303), the system control unit 50 determines whether the input is due to an operation of an end button (step S307).

When the input is due to the operation of the end button (YES in the step S307), the system control unit 50 finishes this process. Thereby, the replay mode is terminated.

When the input is not due to the operation of the end button (NO in the step S307), the system control unit 50 determines whether the input is due to an operation of a trimming button (step S308).

When the input is due to the operation of the trimming button (YES in the step S308), the system control unit 50 performs a trimming process (step S309), and then proceeds with the process to the step S302.

When the input is not due to the operation of the trimming button (NO in the step S308) on the other hand, the system control unit 50 determines whether the input is due to an operation of a retrieval button (step S310).

When the input is due to the operation of the retrieval button (YES in the step S310), the system control unit 50 performs a retrieval process (step S311), and then proceeds with the process to the step S302. In this retrieval process, the system control unit 50 retrieves image data based on the attribute information of the image data analyzed in the above-mentioned file analysis process. For example, the imaging information of the image data, favorite information, a tag, a person's name, etc. are used as keys to retrieve.

When the input is not due to the operation of the retrieval button (NO in the step S310) on the other hand, the system control unit 50 performs another process in response to the operation (step S312), and then proceeds with the process to the step S302. Another process may be a change to multi-reproduction, menu indication by the menu button, or the like.

FIG. 4 is a flowchart showing the file analysis process executed in the step S305 in FIG. 3.

As shown in FIG. 4, the system control unit 50 determines whether the image data as an analytical object has the file header that describes attribute information, such as imaging information and classification information (step S401). The imaging information includes the information about image pickup time, an imaging mode at the time of image pickup, etc. The classification information is identification information used for retrieving image data, and shows the person's name included in the frame information, the tag information, and so on.

When the image data does not have a file header (NO in the step S401), the system control unit 50 proceeds with the process to step S404. On the other hand, when the image data has a file header (YES in the step S401), the system control unit 50 acquires the imaging information from the file header (step S402), and acquires the classification information etc. from the file header (step S403).

Next, the system control unit 50 acquires image data information (step S404), and finishes this process. Here, the image data information includes information about a file format of image data, an image body starting point extracted based on the file format, an image compression method, etc.

FIG. 5 is a view showing frame information 501 relevant to the trimming process.

The frame information 501 shown in FIG. 5 is stored in the memory 32, and consists of frame attribute information 502, frame area information 503, frame center information 504, and frame related information 505.

The frame attribute information 502 shows the attribute of the image in the specific area that is defined by the frame area information 503. Specifically, the frame attribute information 502 shows a face recognition frame displayed when a person is recognized, a focusing frame that shows an area to be focused, an automatic exposure frame that shows an object area of the automatic exposure, and a subject recognition frame displayed when a subject other than a person is recognized. These frames can be recorded as the frame attribute information 502.

The frame area information 503 is shows the specific area in the image that is shown by the image data, and shows width and height of the frame. The frame center information 504 shows the center coordinate of the frame. For example, the center coordinate is expressed with X coordinate and Y coordinate in a coordinate system of which the origin is the left upper corner of the image.

The frame related information 505 includes attribute information, such as a "person's name", a "birthday", a "gender", and a "facial feature" of the recognized person, for example, when the frame attribute information 502 shows that the frame is a facial recognition frame. According to the frame type shown by the frame attribute information 502, the types of information recorded on the frame related information 505 also differ.

The "facial feature" includes the coordinate information of each facial part ("coordinates of both eyes", "coordinate of a nose", "a size of profile", "coordinates of mouth edges", etc.) and the information showing the success or failure of image pickup result (existence or nonexistence of "closed eyes", "an orientation of a face", etc.). Thus, the frame information 501 further includes the information showing the coordinates of the parts used as the facial features in the image when the attribute information shows that the image in the specific area is used for the facial recognition.

The frame related information 505 includes a "focus rate" and a "frame effective area". The "focus rate" shows degree of the focus to the subject included within the frame. The "frame effective area" is an essential area associated with the frame information 501. Only when the "frame effective area" is included in image data after trimming, the frame information 501 becomes effective to the trimmed image data. The frame effective area may be information showing a specific point (the center of the frame, for example), and may be area information about an area with width and height.

It should be noted that the frame center coordinate 504 and the coordinates of both eyes correspond to the frame effective area when the frame attribute information 502 shows that the frame is a facial recognition frame.

Hereafter, three different embodiments will be described about the trimming process executed in the step S309 in FIG. 3. Every embodiment determines whether the frame information should be added to the trimming image according to the information about the change of the specific area corresponding to the frame information due to trimmings and the attribute information relevant to the frame information.

Figure 6:
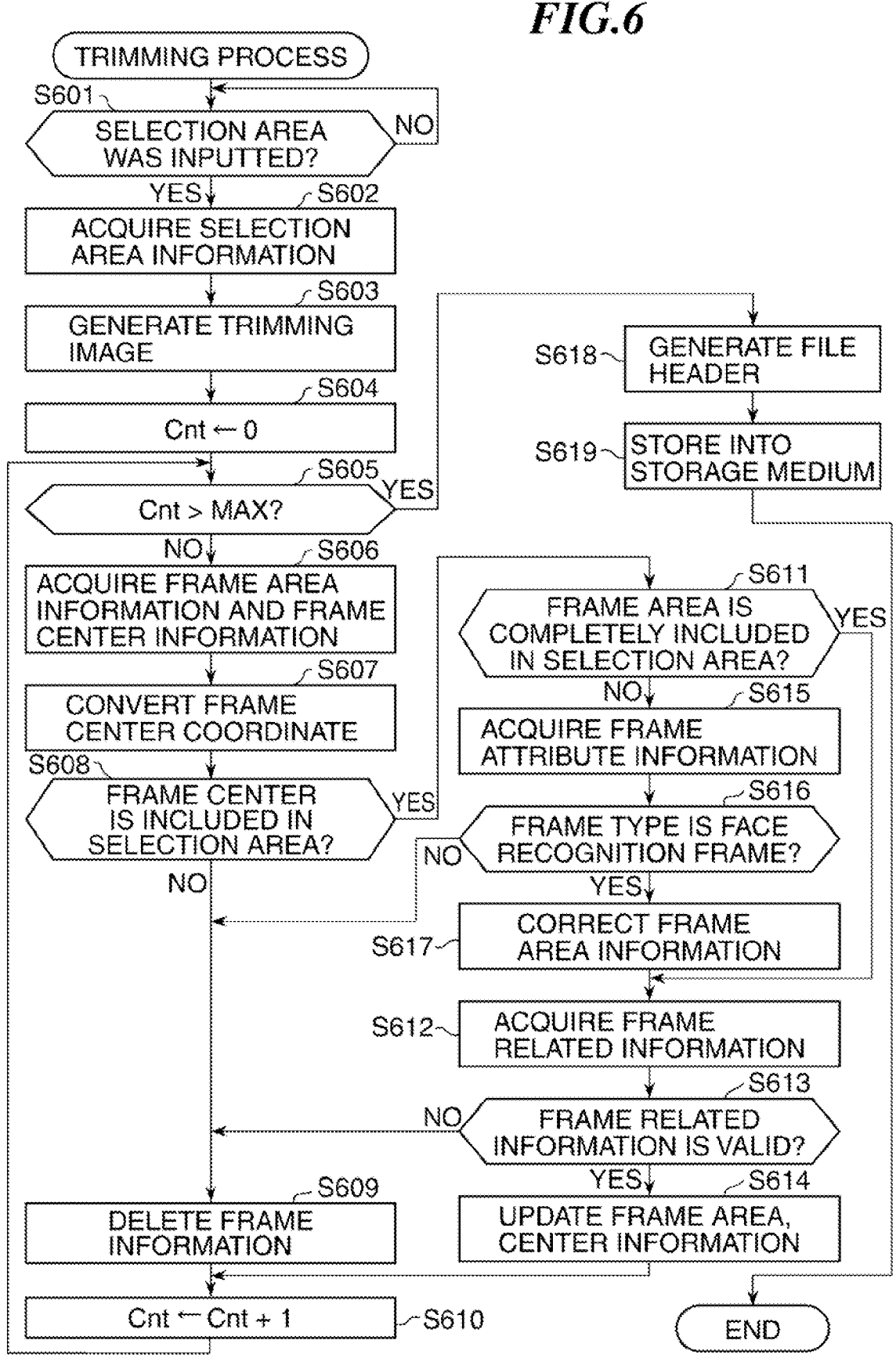
FIG. 6 is a flowchart showing a first example of a trimming process executed in the step S309 in FIG. 3.

FIG. 6 is a flowchart showing a first example of the trimming process executed in the step S309 in FIG. 3.

As shown in FIG. 6, the system control unit 50 determines whether a selection area that is a target area of trimming was inputted (step S601). Here, the input of the selection area means an input of width, height, and center coordinate of the selection area that is trimmed by a user, and the input may be performed by operating physical buttons and may be performed by touch operations.

When the selection area was inputted (YES in the step S601), the system control unit 50 acquires selection area information showing the selection area (step S602). Here, the selection area information shows the width, height, and center coordinate of the selection area.

Next, the system control unit 50 generates a trimming image by cutting out the image within the selection area, and develops it onto the memory 32 (step S603).

Next, the system control unit 50 initializes a loop counter Cnt by 0 (step S604). The value of this loop counter Cnt corresponds to the frame information associated with the image data. Next, the system control unit 50 determines whether Cnt is larger than MAX (step S605). Here, MAX is a total number of pieces of the frame information and is acquired by the process in the step S301 or S305.

When Cnt is not larger than MAX (NO in the step S605), the system control unit 50 acquires the frame area information 503 and the frame center information 504 from the frame information 501 shown by the counter Cnt. Next, the system control unit 50 converts the frame center coordinate shown in the frame center information 504 acquired in the step S606 into the coordinate in the selection area after trimming shown in the selection area information acquired in the step S602 (step S607).

Next, the system control unit 50 determines whether the converted frame center coordinate is included in the selection area (step S608). When the converted frame center coordinate is not included in the selection area (NO in the step S608), the system control unit 50 deletes this frame information 501 (step S609), increments Cnt by 1 (step S610), and proceeds with the process to the step S605.

On the other hand, when the converted frame center coordinate is included in the selection area (YES in the step S608), the system control unit 50 determine whether the frame area shown in the frame area information 503 is completely included in the selection area (step S611).

When the frame area is completely included in the selection area (YES in the step S611), the system control unit 50 acquires the frame related information 505 (step S612), and determines whether the frame related information 505 is valid (step S613).

When the frame related information 505 is invalid (NO in the step S613), the system control unit 50 proceeds with the process to the step S609. On the other hand, when the frame related information 505 is valid (YES in the step S613), the system control unit 50 updates the frame area information 503 and the frame center information 504 that are stored in the memory 32 to the information about the image in the selection area after trimming (step S614), and proceeds with the process to the step S610.

On the other hand, when the frame area is not completely included in the selection area (i.e., a part of the frame area is not included in the selection area, NO in the step S611), the system control unit 50 acquires the frame attribute information 502 (step S615), and determines whether the frame type shown by the frame attribute information 502 is the face recognition frame (step S616).

When the frame type shown by the frame attribute information 502 is not the face recognition frame (NO in the step S616), the system control unit 50 proceeds with the process to the step S609.

On the other hand, when the frame type shown by the frame attribute information 502 is the face recognition frame (YES in the step S616), the system control unit 50 corrects the frame area information 503 so that the frame falls within the selection area (step S617), and proceeds with the process to the step S612.

When Cnt is larger than MAX (YES in the step S605), the system control unit 50 generates information showing the width, height, etc. of the image as a file header of the image data showing the trimming image (step S618). Then, the system control unit 50 generates an image file using the image data after trimming and the file header generated therefor, stores the image file into the storage medium 200 (step S619), and finishes this process.

When it is determined that the frame type shown by the frame attribute information 502 is the face recognition frame in the step S616, the system control unit 50 corrects the frame area information 503 without deleting the frame information 501. As a result, even when a part of the image within the frame showing a face is lost by trimming, the image can serve as a target of person's name search in the retrieval process as long as the person can be recognized. Although the digital still camera with the face recognition function has been described in the embodiment, the process using this embodiment is also effective in the case where an image processing apparatus without the face recognition function performs trimming. This is because the face frame information that is originally given to the image data can be used without performing the face recognition process again. And since the analysis process of image data is unnecessary, the processing load is light.

When the frame type is not the face recognition frame but the focusing frame, the automatic exposure frame, etc., since the information in the focusing area and the automatic exposure area becomes invalid when a part of image is lost by trimming, the frame information is deleted in the step S609.

According to the trimming process in FIG. 6, when the center of the specific area (the frame center) is included in the trimming image (YES in the step S608) and the frame type is the face recognition frame (YES in the step S616), the following process is performed. That is, the frame information is updated as frame information relevant to the trimming image. As a result, the frame information associated with the image data can be used for the image after trimming effectively.

As mentioned above, the system can select keeping or deleting the area information of the position of the person's face according to the trimming area. Then, when the process returns to the step S306 in FIG. 3 after the process in FIG. 6, the system can determine whether the updated area information is displayed on a screen on which the image after trimming is displayed.

Figure 7:
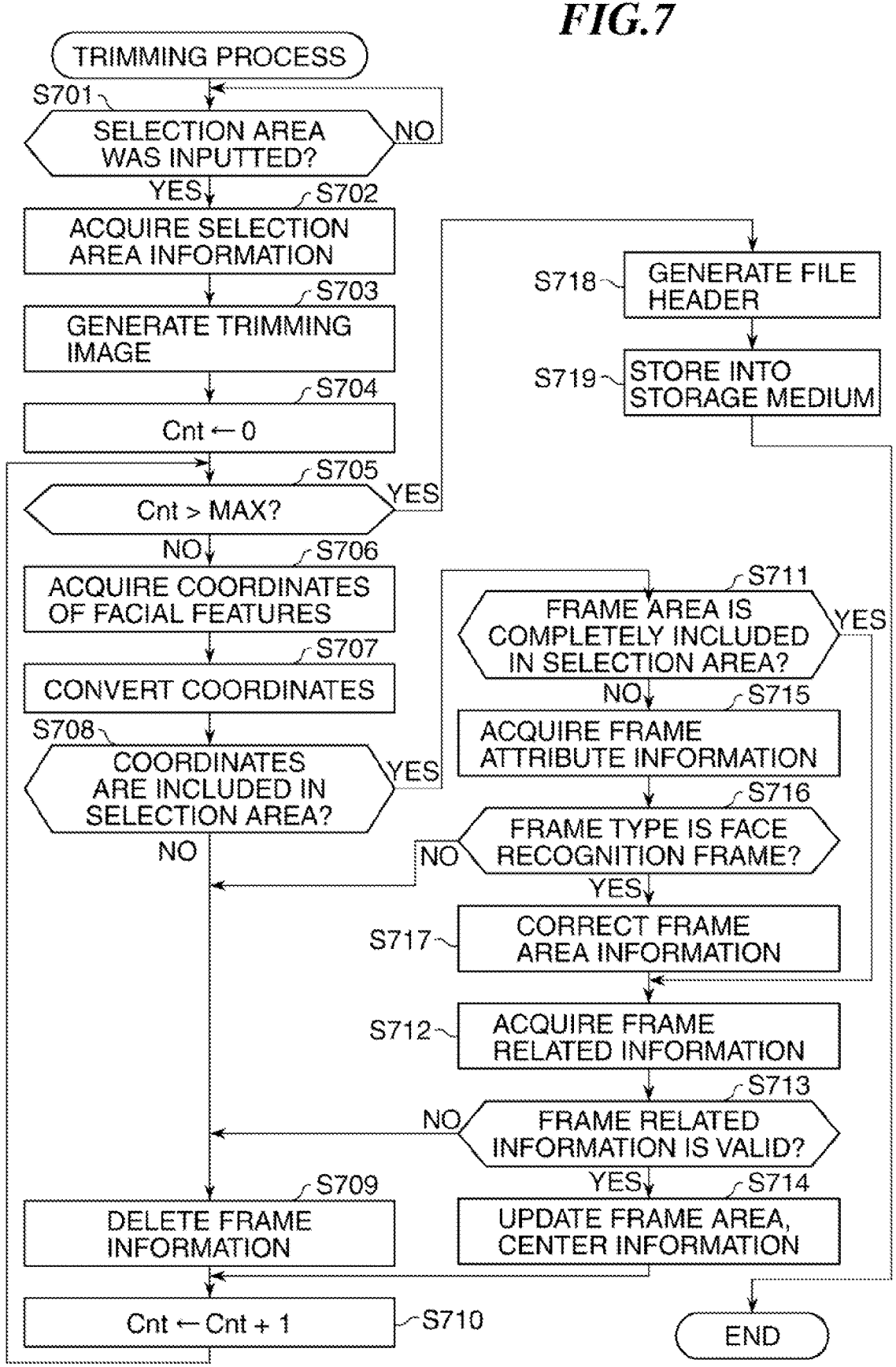
FIG. 7 is a flowchart showing a second example of the trimming process executed in the step S309 in FIG. 3.

FIG. 7 is a flowchart showing a second example of the trimming process executed in the step S309 in FIG. 3.

The example in FIG. 6 determines whether the frame information would be added to the image after trimming using the frame center coordinate. The example in FIG. 7 determines whether the frame information would be added to the image after trimming using the facial features (positions of eyes and nose, particularly) in the frame instead of the frame center coordinate.

The following description describes on the assumption that the frame related information 505 has coordinates of the facial features (coordinates of both eyes and nose). When the frame related information 505 does not have coordinates of the facial features (coordinates of both eyes and nose), the process in FIG. 6 or a process in FIG. 8 mentioned later will be performed.

Since the trimming process shown in FIG. 7 differs from that in FIG. 6 in steps S706 through S708 corresponding to the steps S606 through S608 in FIG. 6, the process in the steps S706 through S708 will be described.

As shown in FIG. 7, the system control unit 50 acquires the coordinates of the facial features of the frame related information 505 from the frame information 501 (step S706). Although this flowchart uses the coordinates of both eyes, the coordinate of nose or the coordinates of mouth edges may be used. The information about the coordinates of the both eyes in this embodiment is the information about the area surrounding the both eyes. The area information may be defined by the coordinates of corners of a rectangular area, or may be defined by an elliptic area.

Next, the system control unit 50 converts the coordinates of the both eyes acquired in the step S706 into the coordinates after trimming in the coordinate system based on the selection area information acquired in the step S702 (step S707).

Next, the system control unit 50 determines whether the converted coordinates of the both eyes are included in the selection area (step S708). When the converted coordinates of the both eyes are not included in the selection area (NO in the step S708), the system control unit 50 deletes this frame information 501 (step S709).

On the other hand, when the converted coordinates of the both eyes are included in the selection area (YES in the step S708), the system control unit 50 proceeds with the process to step S711.

Thus, since the person can be recognized as long as the areas of the eyes remain even if a part of the face area is lost by trimming, the frame information is kept for such an image, which does not waste the frame information.

The frame information related to the trimming image is generated based on the coordinates showing positions in the image used as the facial features in addition to the trimming image, the specific area, and the attribute shown by the frame information in the trimming process in FIG. 7.

Figure 8:
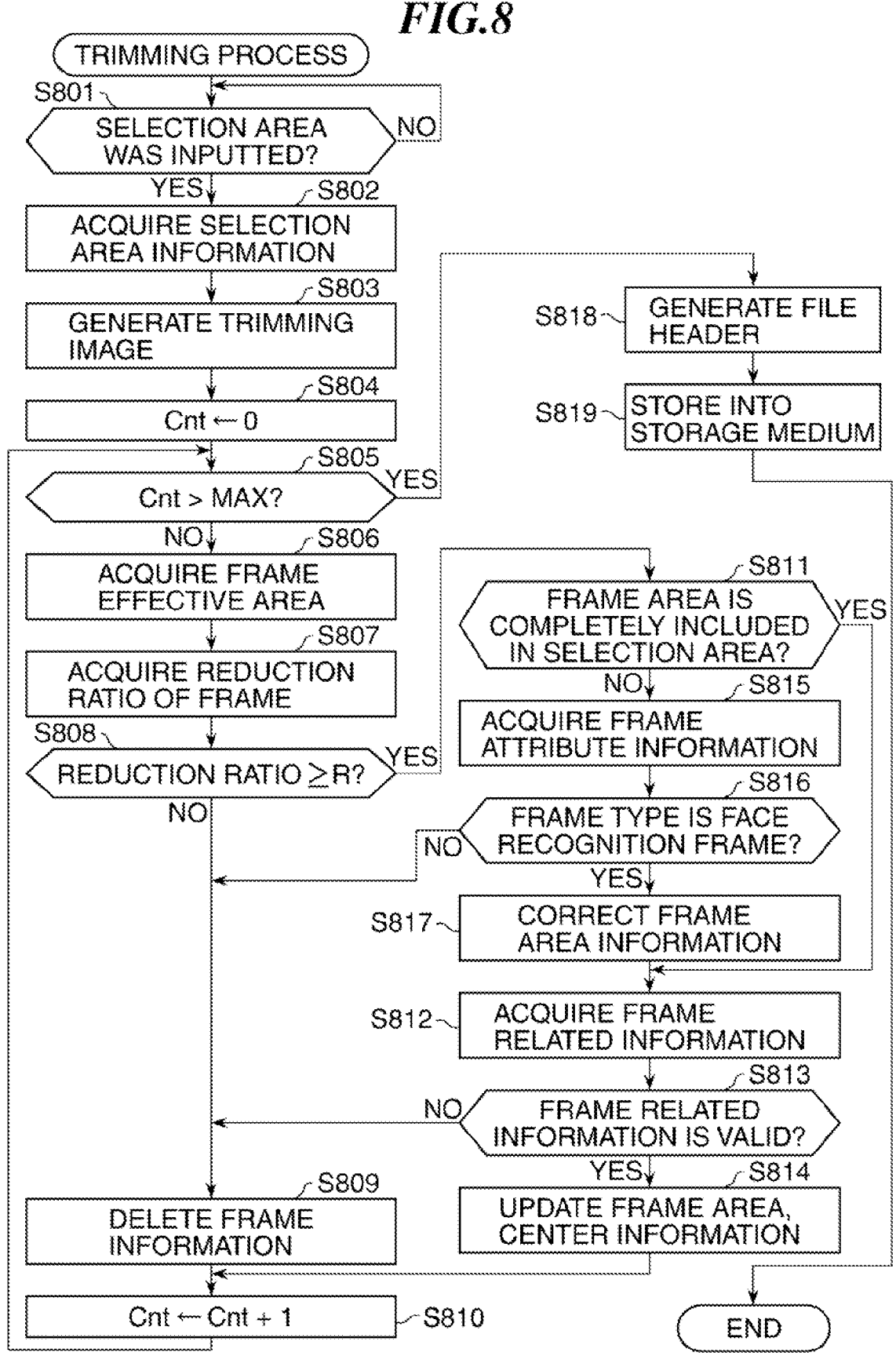
FIG. 8 is a flowchart showing a third example of the trimming process executed in the step S309 in FIG. 3.

FIG. 8 is a flowchart showing a third example of the trimming process executed in the step S309 in FIG. 3.

Since the trimming process shown in FIG. 8 differs from that in FIG. 6 in steps S806 through S808 corresponding to the steps S606 through S608 in FIG. 6, the process in the steps S806 through S808 will be described.

As shown in FIG. 8, the system control unit 50 acquires the frame effective area of the frame related information 505 from the frame information 501 (step S806). Next, the system control unit 50 acquires reduction ratio of the frame based on the width and height shown by the frame information 501 before trimming and the width and height shown by the frame information 501 after trimming (step S807). The width and height shown by the frame information 501 after trimming indicate the intersection of the frame effective area and the trimming image. Accordingly, the reduction ratio shows the ratio between the size of the frame effective area and the size of the intersection of the frame effective area and the trimming image.

Next, the system control unit 50 determines whether the reduction ratio is not smaller than R (step S808). The constant R is a threshold value that has been determined beforehand in order to decide whether the frame information is given to the image after trimming according to the reduction ratio. The constant R may be a fixed value (50%, for example), or may be determined for each type according to the size of the display unit 28.

The system control unit 50 proceeds with the process to step S811 when the reduction ratio is not smaller than R (YES in the step S808), and proceeds with the process to step S809 when the reduction ratio is smaller than R (NO in the step S808).

Although the determination in the step S808 is based on the reduction ratio, the determination may be based on whether the area defined by the width, height, and center coordinate remains within the trimming area.

Thus, when the determination is based on whether the reduction ratio is not smaller than the predetermined value, the frame information is maintainable to the image that is easy to recognize.

A method of determining whether the frame information should be kept based on closed eyes, an orientation of a face, or a focusing rate, as with the trimming process shown in FIG. 8 can be employed.

The trimming process in FIG. 8 updates the frame information to the frame information related to the trimming image based on the ratio between the size of the frame effective area and the size of the intersection of the frame effective area and the trimming image, in addition to the trimming image, the specific area, and the attribute shown by the frame information.

In the three trimming processes, when the frame information is invalid for the trimming image, the frame information is not updated as the frame information related to the trimming image. Specifically, the frame information that is invalid for the trimming image is the information about the focusing frame or the automatic exposure frame that is valid only when the entire frame area is effective as described in the description about the step S611.

It should be noted that the frame information is not limited to the information about frame, but means the area information showing a specific area in an image. The shape of the area is not limited to a rectangle, it may be a circle, an ellipse, or a closed region of arbitrary shape.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-277062, filed on Dec. 19, 2011, which is hereby incorporated by reference herein in its entirety.

What is claimed is:

1. An image processing apparatus that processes image data with which face frame information about a partial area in an image is associated, comprising:
   a trimming unit configured to cut out a selected area as a trimmed image from an image represented by the image data; and
   a determination unit configured to determine that the face frame information updated according to the selected area cut out by said trimming unit is not added to the trimmed image if a center part of the partial area represented by the face frame information, an eye area of the partial area represented by the face frame information, or a nose area of the partial area represented by the face frame information is not included in the trimmed image,
   wherein said determination unit determines, if the center part of the partial area represented by the face frame information, the eye area of the partial area represented by the face frame information, or the nose area of the partial area represented by the face frame information is included in the trimmed image and a part of the partial area represented by the face frame information is not included in the trimmed image, that the updated face frame information is added to the trimmed image.

2. The image processing apparatus according to claim 1, wherein a person's name information is associated with the face frame information, and the person's name information is added to the updated face frame information when said determination unit determines that the updated face frame information is added to the trimmed image according to the selected area cut out by said trimming unit.

3. An image processing apparatus that processes image data with which face frame information about a partial area in an image is associated, comprising:
   a trimming unit configured to cut out a selected area as a trimmed image from an image represented by the image data; and
   a determination unit configured to determine that the face frame information updated according to the selected area cut out by said trimming unit is not displayed together with the trimmed image if a center part of the partial area represented by the face frame information, an eye area of the partial area represented by the face frame information, or a nose area of the partial area represented by the face frame information is not included in the trimmed image,
   wherein said determination unit determines, if the center part of the partial area represented by the face frame information, the eye area of the partial area represented by the face frame information, or the nose area of the partial area represented by the face frame information is included in the trimmed image and a part of the partial area represented by the face frame information is not included in the trimmed image, that the updated face frame information is displayed together with the trimmed image.

4. The image processing apparatus according to claim 3, wherein a person's name information is associated with the face frame information, and the person's name information is further displayed when said determination unit determines that the updated face area information is displayed together with the trimmed image.

5. An image processing method for processing image data with which face frame information about a partial area in an image is associated, the method comprising:
   cutting out a selected area as a trimmed image from an image represented by the image data;
   excluding the face frame information updated according to the cut out selected area from the trimmed image if a center part of the partial area represented by the face frame information, an eye area of the partial area represented by the face frame information, or a nose area of the partial area represented by the face frame information is not included in the trimmed image; and
   adding, if the center part of the partial area represented by the face frame information, the eye area of the partial area represented by the face frame information, or the nose area of the partial area represented by the face frame information is included in the trimmed image and a part of the partial area represented by the face frame information is not included in the trimmed image, the updated face frame information to the trimmed image.

6. An image processing method for processing image data with which face frame information about a partial area in an image is associated, the method comprising:
   cutting out a selected area as a trimmed image from an image represented by the image data;
   excluding the face frame information updated according to the cut out selected area from being displayed together with the trimmed image if a center part of the partial area represented by the face frame information, an eye area of the partial area represented by the face frame information, or a nose area of the partial area represented by the face frame information is not included in the trimmed image; and
   displaying, if the center part of the partial area represented by the face frame information, the eye area of the partial area represented by the face frame information, or the nose area of the partial area represented by the face frame information is included in the trimmed image and a part of the partial area represented by the face frame information is not included in the trimmed image, the updated face frame information together with the trimmed image.

* * * * *